(12) United States Patent
Zhao

(10) Patent No.: US 11,714,866 B2
(45) Date of Patent: Aug. 1, 2023

(54) METHOD AND DEVICE FOR PAGE PROCESSING, ELECTRONIC DEVICE, AND COMPUTER-READABLE STORAGE MEDIUM

(71) Applicant: Beijing Bytedance Network Technology Co., Ltd., Beijing (CN)

(72) Inventor: Jianxu Zhao, Beijing (CN)

(73) Assignee: BEIJING BYTEDANCE NETWORK TECHNOLOGY CO., LTD., Shijingshan District Beijing (CN)

( * ) Notice: Subject to any disclaimer, the term of this patent is extended or adjusted under 35 U.S.C. 154(b) by 0 days.

(21) Appl. No.: 17/843,306

(22) Filed: Jun. 17, 2022

(65) Prior Publication Data
US 2022/0318328 A1    Oct. 6, 2022

Related U.S. Application Data

(63) Continuation of application No. PCT/CN2021/074183, filed on Jan. 28, 2021.

(30) Foreign Application Priority Data

Mar. 25, 2020 (CN) .......................... 202010219265.6

(51) Int. Cl.
*G06F 16/9538* (2019.01)
*G06F 16/9535* (2019.01)
*G06F 16/957* (2019.01)

(52) U.S. Cl.
CPC ...... *G06F 16/9535* (2019.01); *G06F 16/9538* (2019.01); *G06F 16/9574* (2019.01)

(58) Field of Classification Search
CPC .............. G06F 16/951; G06F 16/9535; G06F 16/9536; G06F 16/9538; G06F 16/9574
See application file for complete search history.

(56) References Cited

U.S. PATENT DOCUMENTS 10,231,090 B1 * 3/2019 Natarajan ............. H04W 4/021
2013/0282683 A1 * 10/2013 Kohavi ................. G06F 16/954
707/723
(Continued)

FOREIGN PATENT DOCUMENTS

| CN | 106033433 A | 10/2016 |
| CN | 106598964 A | 4/2017 |

(Continued)

OTHER PUBLICATIONS

International Search Report issued in corresponding International Application No. PCT/CN2021/074183 dated Apr. 27, 2021.

*Primary Examiner* — Kris E Mackes
(74) *Attorney, Agent, or Firm* — ArentFox Schiff LLP

(57) ABSTRACT

A method and device for page processing, an electronic device, and a computer-readable storage medium are provided. The method includes: in response to a search operation, transmitting a search request carrying a search keyword to a server, and recording a page triggering the search operation; receiving a search result returned by the server in response to the search request; displaying the search result on a search result page; in response to a page return operation with respect to the search result page, determining a corresponding return page on the basis of the recorded page triggering the search operation; and jumping to the return page. The utilization of the method allows further personalized setting of the return page, allows a user to conveniently and quickly return to a page to which returning is intended, thus enhancing user experience.

17 Claims, 10 Drawing Sheets

(56) References Cited

U.S. PATENT DOCUMENTS

2013/0332311 A1    12/2013  Pu et al.
2016/0210335 A1     7/2016  Cheng
2019/0155949 A1*    5/2019  Castaneda ............. G06F 16/951

FOREIGN PATENT DOCUMENTS

CN      106951148 A    7/2017
CN      107832337 A    3/2018
CN      110717126 A    1/2020
CN      111400625 A    7/2020

* cited by examiner

METHOD AND DEVICE FOR PAGE PROCESSING, ELECTRONIC DEVICE, AND COMPUTER-READABLE STORAGE MEDIUM

CROSS-REFERENCE TO RELATED APPLICATIONS

The present disclosure is a continuation of International Application No. PCT/CN2021/074183, filed on Jan. 28, 2021, which claims priority to Chinese Patent Application No. 2020102192656, filed with the China National Intellectual Property Administration on Mar. 25, 2020, the entire disclosures of which are incorporated herein by reference.

FIELD

The present disclosure relates to the technical field of the Internet, and in particular, to a method and apparatus for processing a page, an electronic device and a computer readable storage medium.

BACKGROUND

At present, when a user searches for information by browsing webpage or using an application, multiple pages needs to be opened.

Generally, when a return operation is performed, the page can only return to an initial page or to a previous page of the page in the multiple pages. When a user wants that the page returns to any one of the multiple pages, the return operation needs be performed multiple times or information to be searched needs be input again.

Therefore, an urgent problem to be solved is how to personalize the return page, such that the page can return to a page the user wants conveniently and quickly, thereby improving the user experience.

SUMMARY

The summary is provided to introduce concepts in a simplified form that are described in detail in the following detailed description. The summary is not intended to identify key features or essential features of the claimed technical solution, nor is it intended to limit the scope of the claimed technical solution.

In a first aspect, a method for processing a page is provided. The method includes:

sending a search request carrying a search keyword to a server in response to a search operation, and recording a page for triggering the search operation;

receiving a search result, where the search result is returned by the server in response to the search request;

displaying the search result on a search result page;

determining a return page based on the recorded page for triggering the search operation, in response to a page return operation on the search result page; and jumping to the return page.

In a second aspect, an apparatus for processing a page is provided. The apparatus includes: a recording module, a receiving module, a display module, a determining module and a jumping module.

The recording module is configured to send a search request carrying a search keyword to a server in response to a search operation, and record a page for triggering the search operation;

The receiving module is configured to receive a search result, where the search result is returned by the server in response to the search request;

The display module is configured to display the search result on a search result page;

The determining module is configured to determine a return page based on the recorded page for triggering the search operation, in response to a page return operation on the search result page; and The jumping module is configured to jump to the return page.

In a third aspect, an electronic device is provided. The electronic device includes: one or more processors; a memory; and one or more application programs.

The one or more application programs are stored in the memory, and the one or more application programs, when executed by the one or more processors, cause the one or more processors to implement the method for processing a page according to the first aspect of the present disclosure.

In a fourth aspect, a computer readable storage medium is provided. The computer readable storage medium stores a computer program. The computer program, which when executed by a processor, causes the processor to implement the method for processing a page according to the first aspect of the present disclosure.

Beneficial effects of the technical solutions according to the present disclosure are described as follows.

A search request carrying a search keyword is sent to a server in response to a search operation. A page for triggering the search operation is recorded, and a search result page corresponding to the search keyword to be searched is obtained. When a page return operation on the search result page is received, a return page may be determined based on the recorded page for triggering the search operation. Different return pages what the user wants correspond to different input search operations. Different search operations determine the corresponding pages for triggering the search operation. The return page depends on the page for triggering the search operation, such that the return page can be personalized and a page what the user wants can be returned conveniently and quickly.

In an embodiment, if the search operation is a search operation for a default keyword displayed on the search home page, a search keyword inputted by a user, or a search operation for any association word displayed on the search association page, a reception of the page return operation on the corresponding search result page indicates that the user may have browsed a search result corresponding to the default keyword, the inputted search keyword or the association word, or that the user does not interest in the search result corresponding to the default keyword, the inputted search keyword or the association word. In this case, a virtual keyboard for the user to input a search keyword may be displayed on the return page, such that the search keyword which the user is interested may be directly input, without clicking to trigger the virtual keyboard by the user.

In an embodiment, if the search operation is a search operation triggered by the recommended word displayed on the search home page, the user may also be interested in other recommended words in the search home page. Therefore, before the trigger operation on the search box in the return page is received, the virtual keyboard for the user to input a search keyword is not displayed on the return page, such that the user may continue to browse other recommended words.

The additional aspects and advantages of the present disclosure will be further described in the following description, which will become obvious from the following description or be understood through the embodiments of the present disclosure.

BRIEF DESCRIPTION OF THE DRAWINGS

In conjunction with the drawings and with reference to the following embodiments, the above and other features, advantages and aspects of the embodiments of the present disclosure are more apparent. The same or similar reference numerals throughout the drawings represent the same or similar elements. It should be understood that the drawings are schematic and the components and elements are unnecessarily drawn to scale.

DETAILED DESCRIPTION OF EMBODIMENTS

Figure 1:
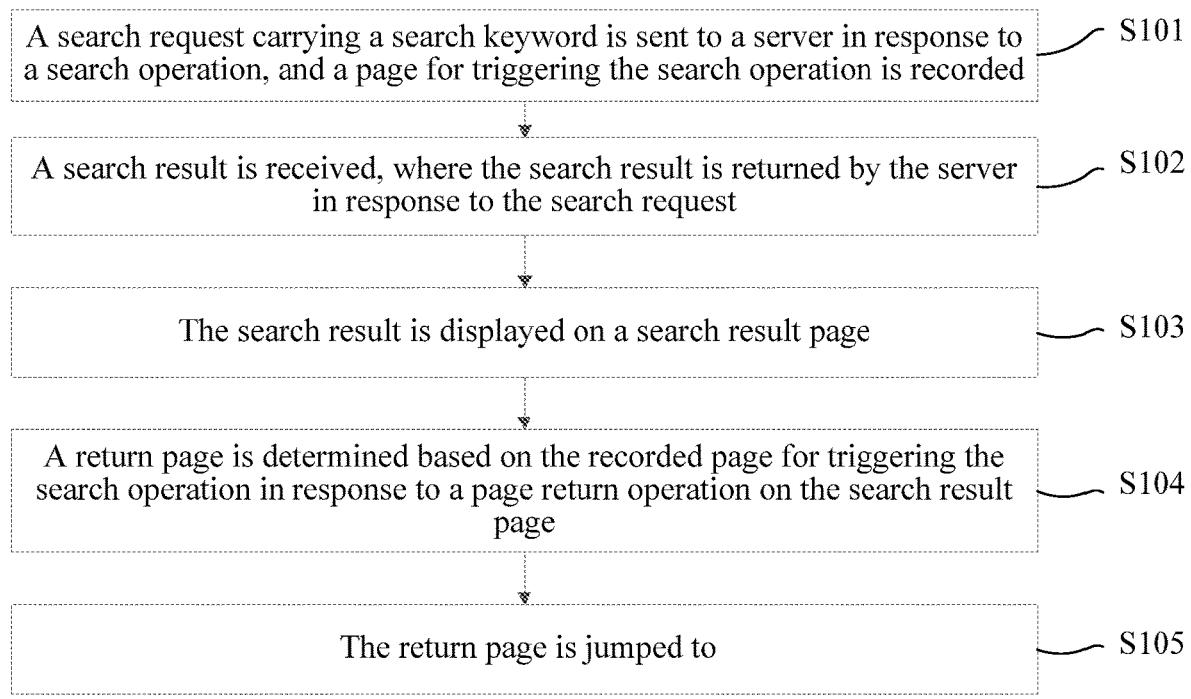
FIG. 1 illustrates a schematic diagram of a flow of a method for processing a page according to an embodiment of the present disclosure.

The embodiments of the present disclosure are described in detail below with reference to the drawings. Although some embodiments of the present disclosure are shown in the drawings, it should be understood that the present disclosure may be implemented in various forms and should not be limited to the embodiments. The embodiments are provided for thoroughly and completely understanding the present disclosure. It should be understood that the drawings and the embodiments of the present disclosure are exemplary and are not intended to limit the protection scope of the present disclosure.

It should be understood that the steps in the method embodiments of the present disclosure may be performed in different orders and/or in parallel. In addition, the method embodiments may include an additional step and/or an omitted step that is not shown herein. The scope of the present disclosure is not limited in this aspect.

The term "include" and its variations in the present disclosure means open-ended inclusion, that is, "including but not limited to". The term "based on" means "based at least in part on". The term "one embodiment" means "at least one embodiment". The term "another embodiment" means "at least one additional embodiment". The term "some embodiments" means "at least some embodiments". The definitions of other terms are provided in the following descriptions.

It should be noted that concepts such as "first" and "second" mentioned in the present disclosure are only used to distinguish apparatuses, modules or units, are not intended to limit the apparatuses, modules or units to be necessarily different apparatuses, modules or units, and are also not intended to limit an sequential order or interdependence of the functions performed by the apparatuses, modules or units.

It should be noted that the modifications such as "one" and "multiple" mentioned in the present disclosure are illustrative and not restrictive. Those skilled in the art should understand that the modifications should be understood as "one or more" unless otherwise expressly indicated in the context.

The names of messages or information exchanged between multiple apparatuses in the embodiments of the present disclosure are only for illustrative purposes, and are not intended to limit the scope of the messages or information.

A method and apparatus for processing a page, an electronic device and a computer-readable storage medium according to the present disclosure are intended to solve the above technical problems in the conventional technology.

The technical solutions of the present disclosure and how to solve the above technical problems with the technical solutions of the present disclosure are described in detail below with specific embodiments. The following specific embodiments may be combined with each other, and the same or similar concepts or processes may not be repeated in some embodiments. The embodiments of the present disclosure are described below with reference to the accompanying drawings.

A method for processing a page is provided according to an embodiment of the present disclosure. The method can be applied to a terminal configured to process a page. As shown in FIG. 1, the method may include the following steps.

In step S101, a search request carrying a search keyword is sent to a server in response to a search operation, and a page for triggering the search operation is recorded.

In step S102, a search result is received, where the search result is returned by the server in response to the search request.

In step S103, the search result is displayed on a search result page.

In step S104, a return page is determined based on the recorded page for triggering the search operation in response to a page return operation on the search result page.

In step S105, the return page is jumped to.

In an embodiment, the search operation is operated in various forms, which may be triggered based on a default keyword displayed on a search home page, or triggered by manually inputting a search keyword by a user on the search home page or a search result page, or triggered based on a recommended word displayed on the search home page. The different scenarios of search operation will be described in detail below.

The search home page refers to a default page used for searching; and the search result page refers to a page that displays the search results that have been searched for.

In an embodiment, a page for triggering the search operation refers to a page displayed after the search operation is received, that is, a page displayed when the search operation is triggered.

In an embodiment, the page for triggering the search operation may also have various forms, which may be triggered through the search home page or directly triggered through the search result page. The page for triggering the search operation will be described in detail below in conjunction with different search operations.

In an embodiment, the page return operation may be triggered in various forms, which may be triggered by a trigger on a control for returning preset on the page, or may be a delete operation for an inputted search keyword or a default keyword and so on.

In the above embodiment, a search request carrying a search keyword is sent to a server in response to a search operation. A page for triggering the search operation is recorded, and a search result page corresponding to the search keyword to be searched is obtained. When a page return operation on the search result page is received, a return page may be determined based on the recorded page for triggering the search operation. Different return pages that the user wants correspond to different input search operations. Different search operations determine the corresponding pages for triggering the search operation. The return page depends on the page for triggering the search operation, such that the return page can be personalized and a page what the user wants can be returned conveniently and quickly.

A possible implementation is provided according to an embodiment of the present disclosure. The return page is determined based on the recorded page for triggering the search operation in Step 104 by:

determining the page for triggering the search operation as the return page, if the page for triggering the search operation is a search home page or a search association page, where an association word associated with a search keyword inputted by a user is displayed on the search association page.

In an embodiment, in the case that the page for triggering the search operation is the search home page or the search association page, the corresponding search operation includes any one of:

a search operation triggered by a default keyword displayed in the search home page or a search keyword inputted by a user;

a search operation triggered by a recommended word displayed in the search home page; and a search operation triggered by an association word displayed in the search association page.

In an embodiment, the search operation is triggered directly through the search home page, for example, the search control on the search home page is directly triggered to search for the default keyword. In this case, the default keyword selected by the user on the search home page is used as a search keyword corresponding to the search operation and the search result page corresponding to the default keyword is entered. Then, the search page is used as the return page. In an embodiment, the search operation is triggered based on the recommended word displayed on the search home page. The recommended word selected by the user is used as the search keyword corresponding to the search operation, and the search result page corresponding to the recommended word is entered. In this case, the search home page is determined as the corresponding return page.

In an embodiment, the search operation is triggered through the search association page, for example, the user manually inputs the search keyword in the search home page. The search association page is entered. In the search association page, the association word that is associated with the search keyword manually inputted by the user is triggered. The association word is used as the search keyword corresponding to the search operation, and the page is jumped to the search result page corresponding to the association word. In this case, the search association page is determined as the return page.

A possible implementation is provided according to an embodiment of the present disclosure. If the search operation is triggered based on a default keyword displayed in the search home page or a search keyword inputted by a user, or triggered based on any association word displayed in the search association page, the method for processing a page further includes: displaying, on the return page, a virtual keyboard for a user to input a search keyword.

In an embodiment, if the search operation is triggered based on a default keyword displayed on the search home page or a search keyword inputted by a user, or triggered by any association word displayed on the search association page, a reception of the page return operation on the corresponding search result page indicates that the user may have browsed the default keyword, the inputted search keyword, or the search result corresponding to the association word, or that the user does not interest in the search result corresponding to the default keyword, the inputted search keyword, or the association word. In this case, a virtual keyboard for the user to input search keyword may be displayed on the return page, such that the search keyword which the user is interested may be directly input without clicking to trigger the virtual keyboard by the user.

A possible implementation is provided according to an embodiment of the present disclosure. If the search operation is triggered based on a recommended word displayed in the search home page, the method for processing a page further includes: displaying, on the return page, no virtual keyboard for a user to input a search keyword, before a trigger operation on a search box in the return page is received.

In an embodiment, if the search operation is triggered based on the recommended word displayed on the search home page, the user may also be interested in other recommended words in the search home page. Therefore, before the trigger operation on the search box in the return page is received, the virtual keyboard for the user to input a search keyword is not displayed on the return page, such that the user may continue to browse other recommended words.

A possible implementation is provided according to an embodiment of the present disclosure. If the page for triggering the search operation is a search result page on which a previous search result is displayed, after the search result is displayed on the search result page in the step S103, the method further includes: deleting a record of the search result page on which the previous search result is displayed, and recording a search home page as a page for triggering the search operation.

In an embodiment, the page for triggering the search operation is a search result page on which a previous search result is displayed. That is, the user has inputted any search operation and has obtained the search result page. The search operation is triggered again on the search result page. It is indicated that the user may have browsed the obtained search result page, or is not interested in the obtained search result page and needs to obtain a new search result page. In this case, a record of the search result page on which the previous search result is displayed is deleted, and a search home page is recorded as a new page for triggering the search operation.

In an embodiment, the determining a return page based on the recorded page for triggering the search operation in Step S104 may include: using the recorded page for triggering the search operation as the return page.

In an embodiment, the page for triggering the search operation is the search result page on which the previous search result is displayed. It is indicated that the user has inputted any search operation and obtained the search result page. A search operation triggered again on the search result page indicates that the user may have browsed the obtained search result page, or is not interested in the obtained search result page and needs to obtain a new search result page. In this case, the search home page is directly returned in a next returning operation, rather than the previous search result page.

The following describes different page return mechanisms corresponding to different pages for triggering the search operation under different search operation scenarios in conjunction with the accompanying drawings and examples.

Figure 2:
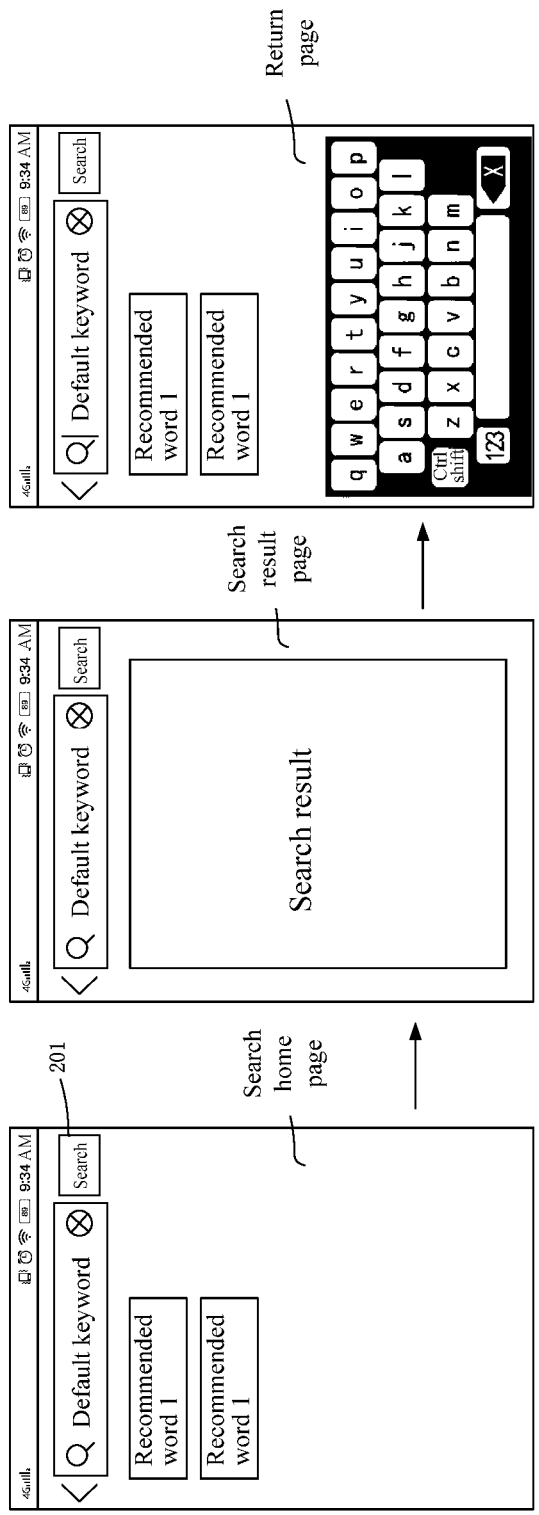
FIG. 2 illustrates a schematic diagram of a page change in a search scenario according to an example of the present disclosure.

1) As shown in FIG. 2, a search operation is directly triggered on the search home page, and a default search control 201 on the search home page is directly clicked to search for a default keyword. That is, the default keyword is used as a search keyword corresponding to the search operation, and a search result page corresponding to the default keyword is entered. Then, the page return operation is inputted to return to the search home page, and a virtual keyboard is displayed.

Figure 3:
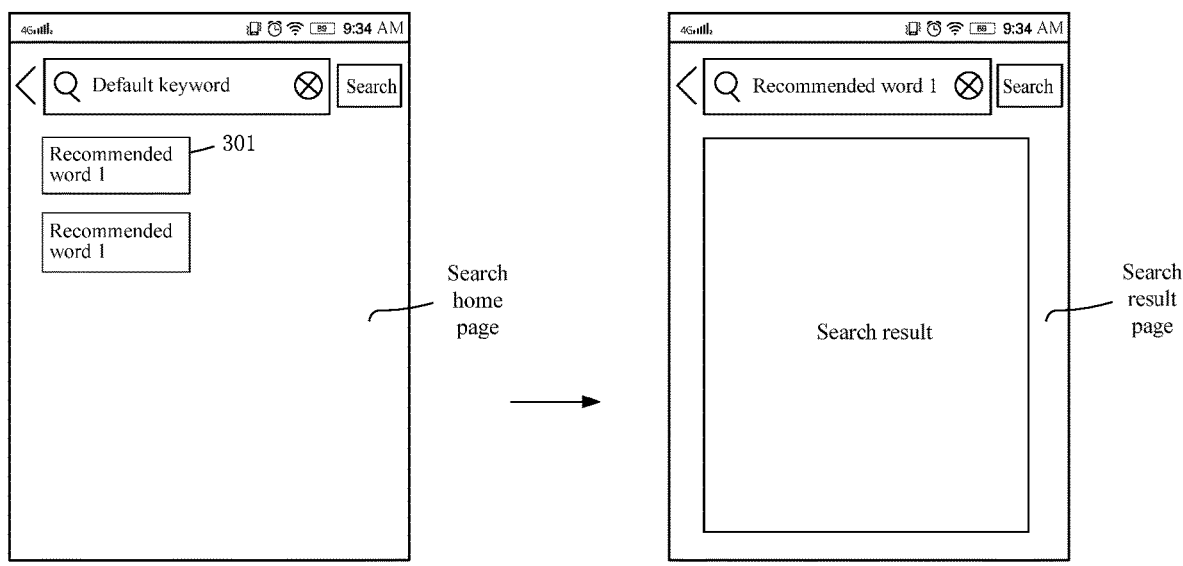
FIG. 3 illustrates a schematic diagram of a page change in a search scenario according to an example of the present disclosure.

2) As shown in FIG. 3, a search operation is directly triggered on the search home page. Any recommended word 301 on the search home page is directly clicked. The recommended word is searched for by using the selected recommended word as a search keyword, and the search result page is entered. Then, the search home page is returned in response to the input of the page return operation, and no virtual keyboard is displayed.

Figure 4:
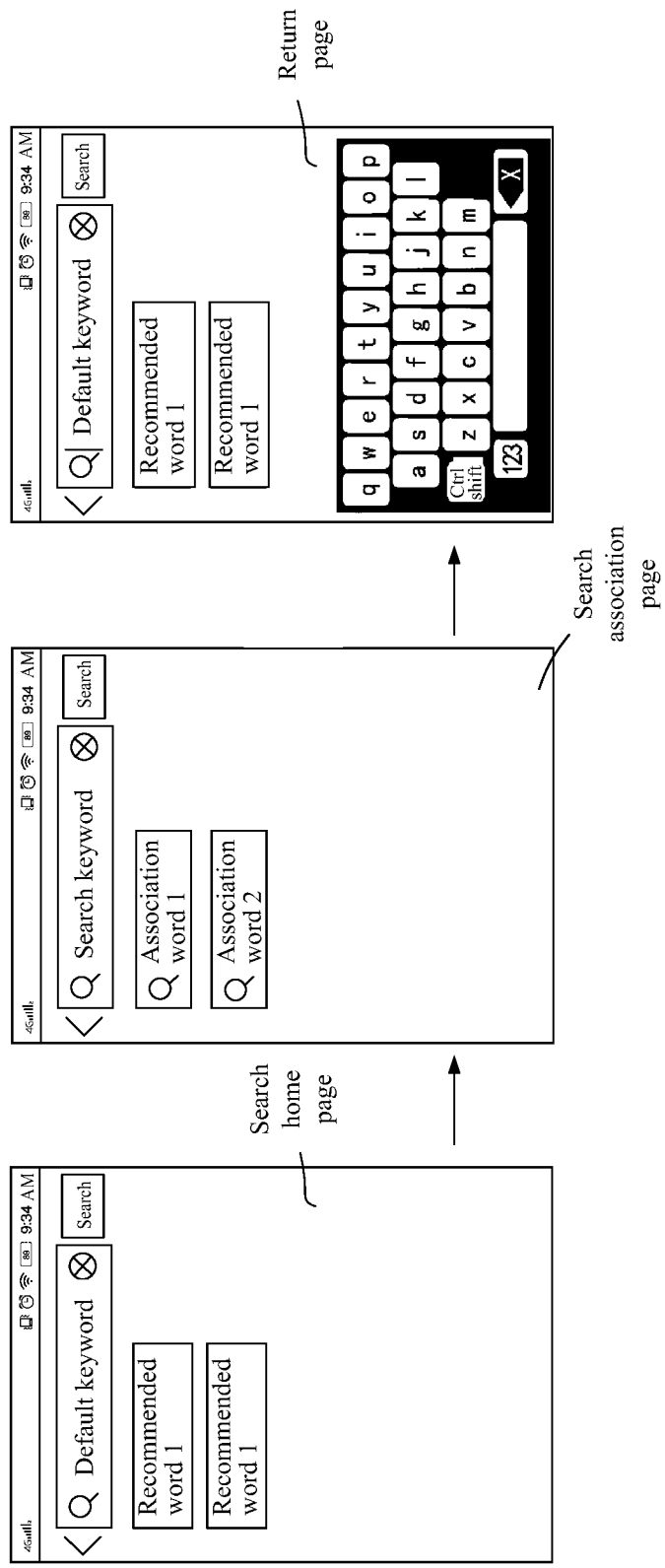
FIG. 4 illustrates a schematic diagram of a page change in a search scenario according to an example of the present disclosure.

3) As shown in FIG. 4, a search keyword is input in the search home page. An association word (also referred to as a sug word) associated with the search keyword is triggered, to enter a search association page (also referred to as a sug page). The search keyword is cleared in the search association page, or the search home page is returned in response to an input of the page return operation. The virtual keyboard is displayed.

Figure 5:
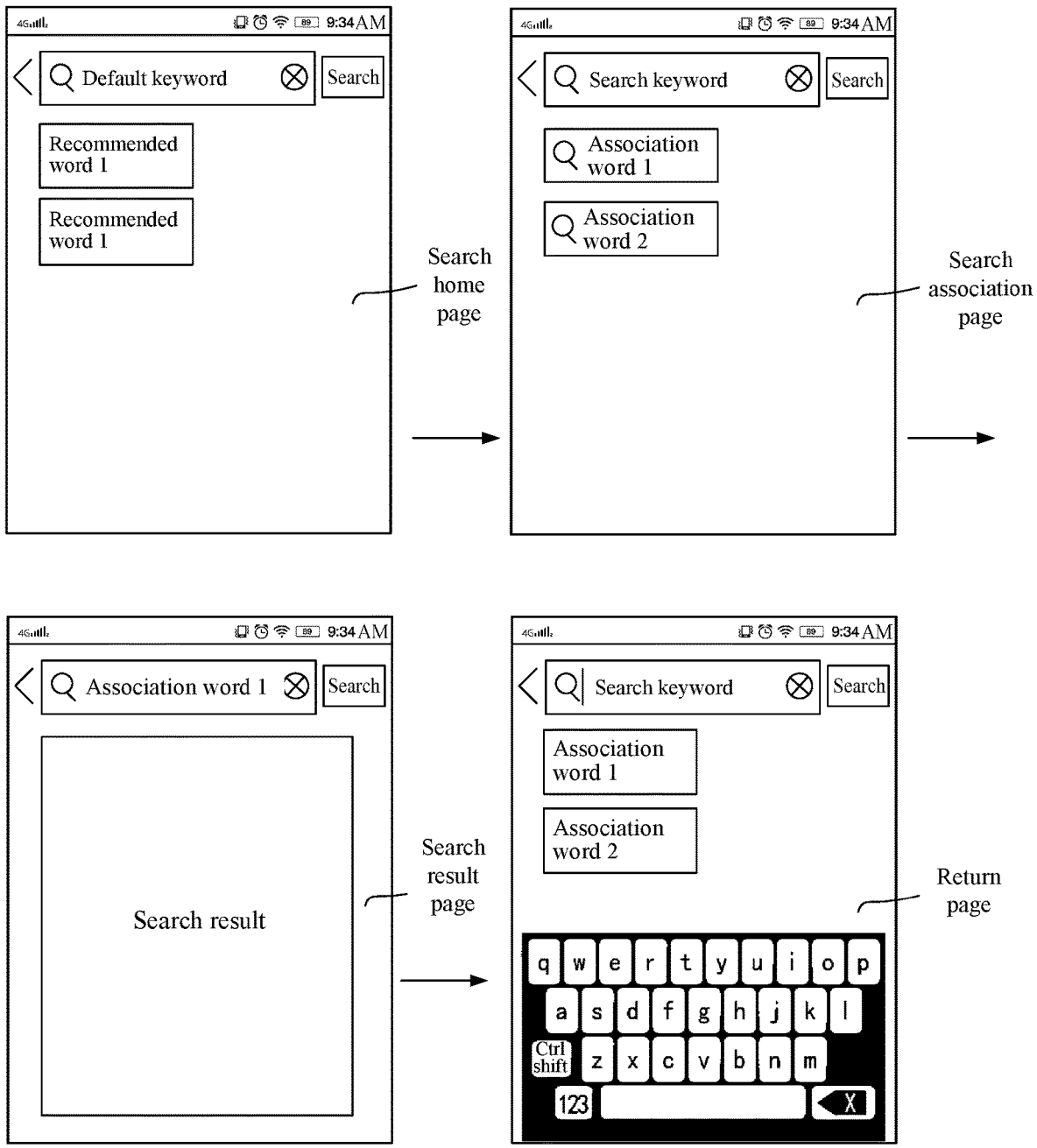
FIG. 5 illustrates a schematic diagram of a page change in a search scenario according to an example of the present disclosure.

4) As shown in FIG. 5, a search keyword is input in the search home page. An association word (also referred to as a sug word) associated with the search keyword is triggered, to enter a search association page (also referred to as a sug page). In the search association page, the association word is clicked to trigger the search operation. The selected association word is used as the search keyword corresponding to the search operation. The search result page corresponding to the association word is entered. The search association page is returned, in response to a return operation in the search result page; and the virtual keyboard is displayed.

Figure 6:
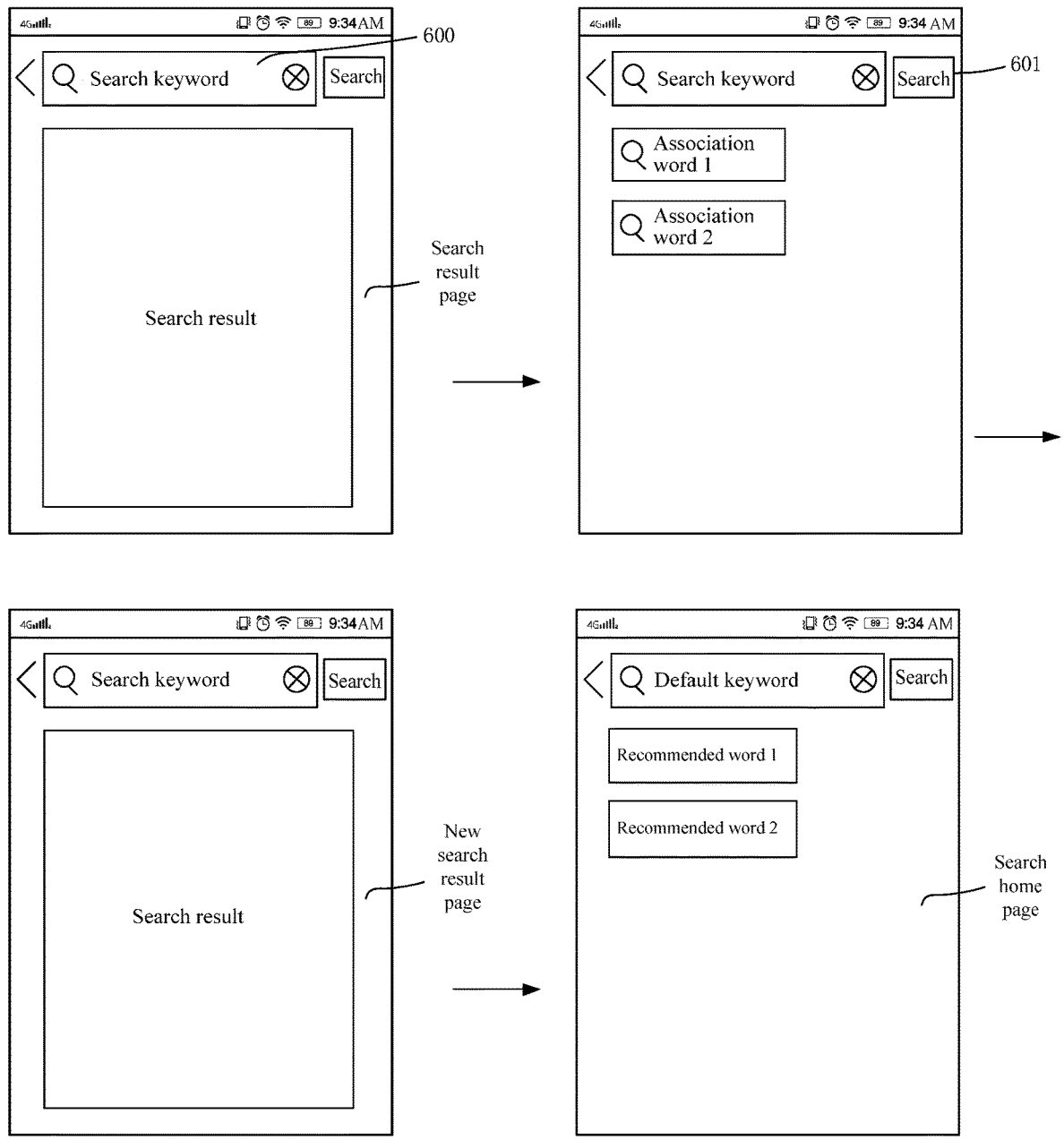
FIG. 6 illustrates a schematic diagram of a page change in a search scenario according to an example of the present disclosure.

5) As shown in FIG. 6, an association word associated with the search keyword is triggered by clicking a search box 600 in the search result page. In this case, no association word is clicked, but the search control 601 is directly clicked. Therefore, the search operation is triggered through the search result page, rather than the search association page. A new search result page is entered, and the search home page is returned in response to a return operation on the new search result page.

Figure 7:
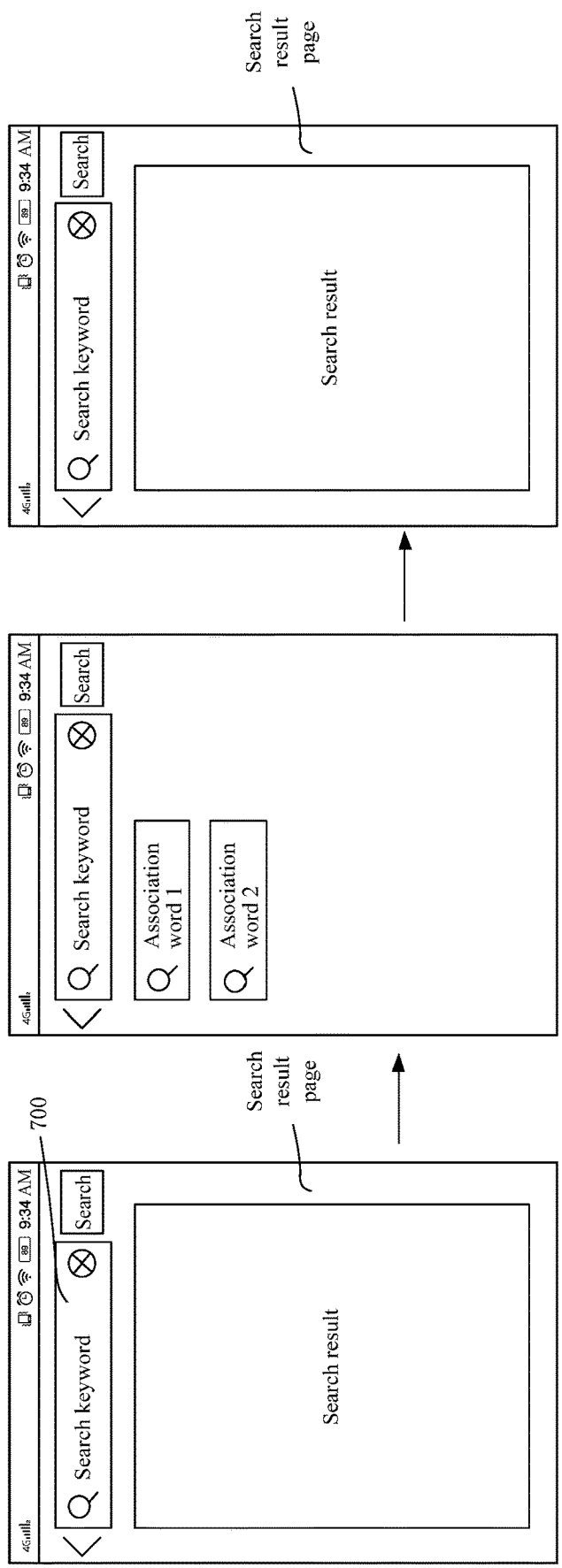
FIG. 7 illustrates a schematic diagram of a page change in a search scenario according to an example of the present disclosure.

6) As shown in FIG. 7, the association word associated with the search keyword is triggered by clicking a search box 700 in the search result page. The search association page is entered, and the return operation is directly performed to return to the search result page.

Figure 8:
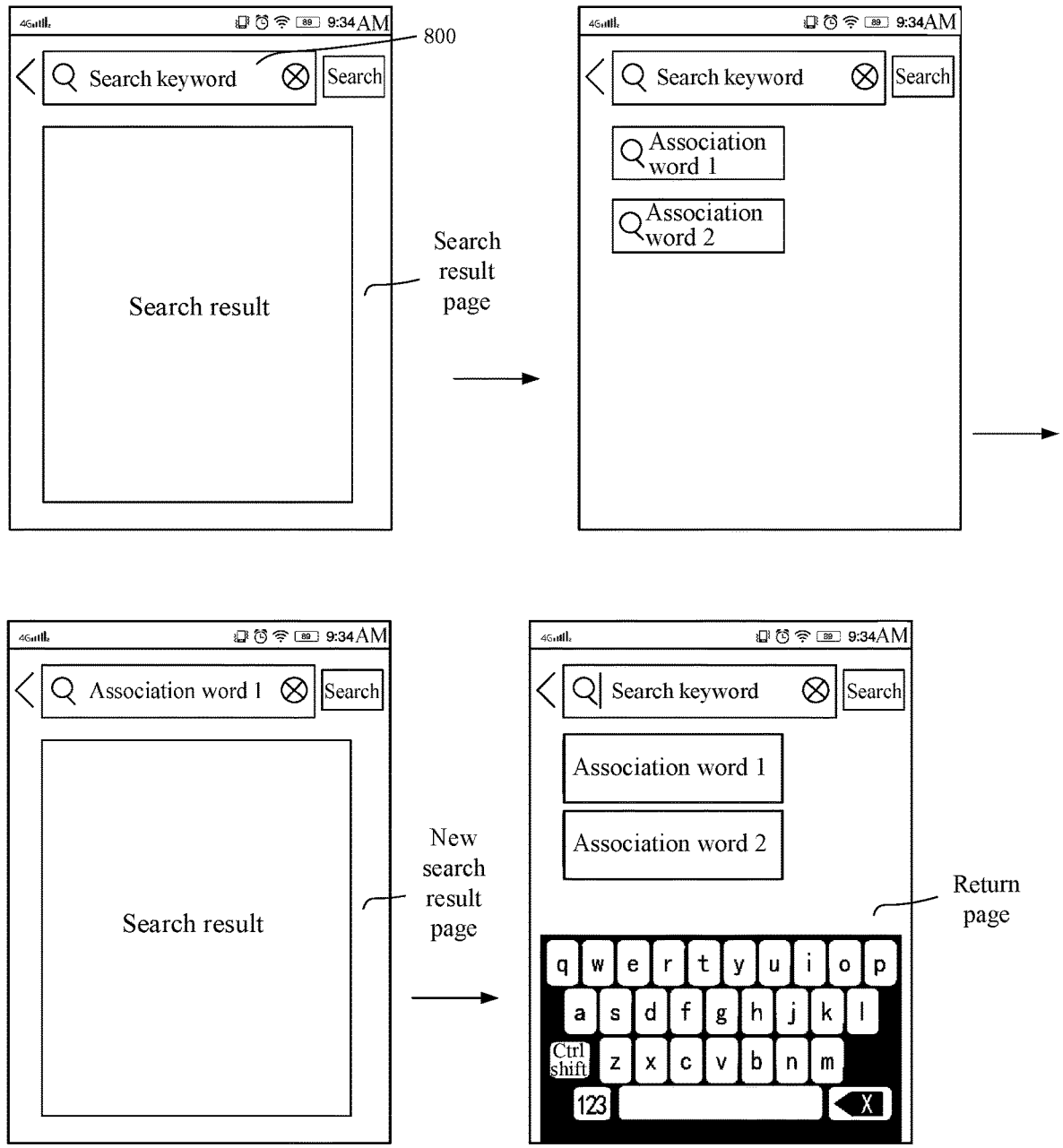
FIG. 8 illustrates a schematic diagram of a page change in a search scenario according to an example of the present disclosure.

7) As shown in FIG. 8, an association word associated with the search keyword is triggered by clicking a search box 800 in the search result page. The search association page is entered. Any association word in the search association page is clicked to trigger the search operation in the search association page. The selected association word is used as the search keyword corresponding to the search operation, to enter a new search result page corresponding to the association word. The search association page is returned in response to the return operation on the new search result page, and the virtual keyboard is displayed.

Figure 9:
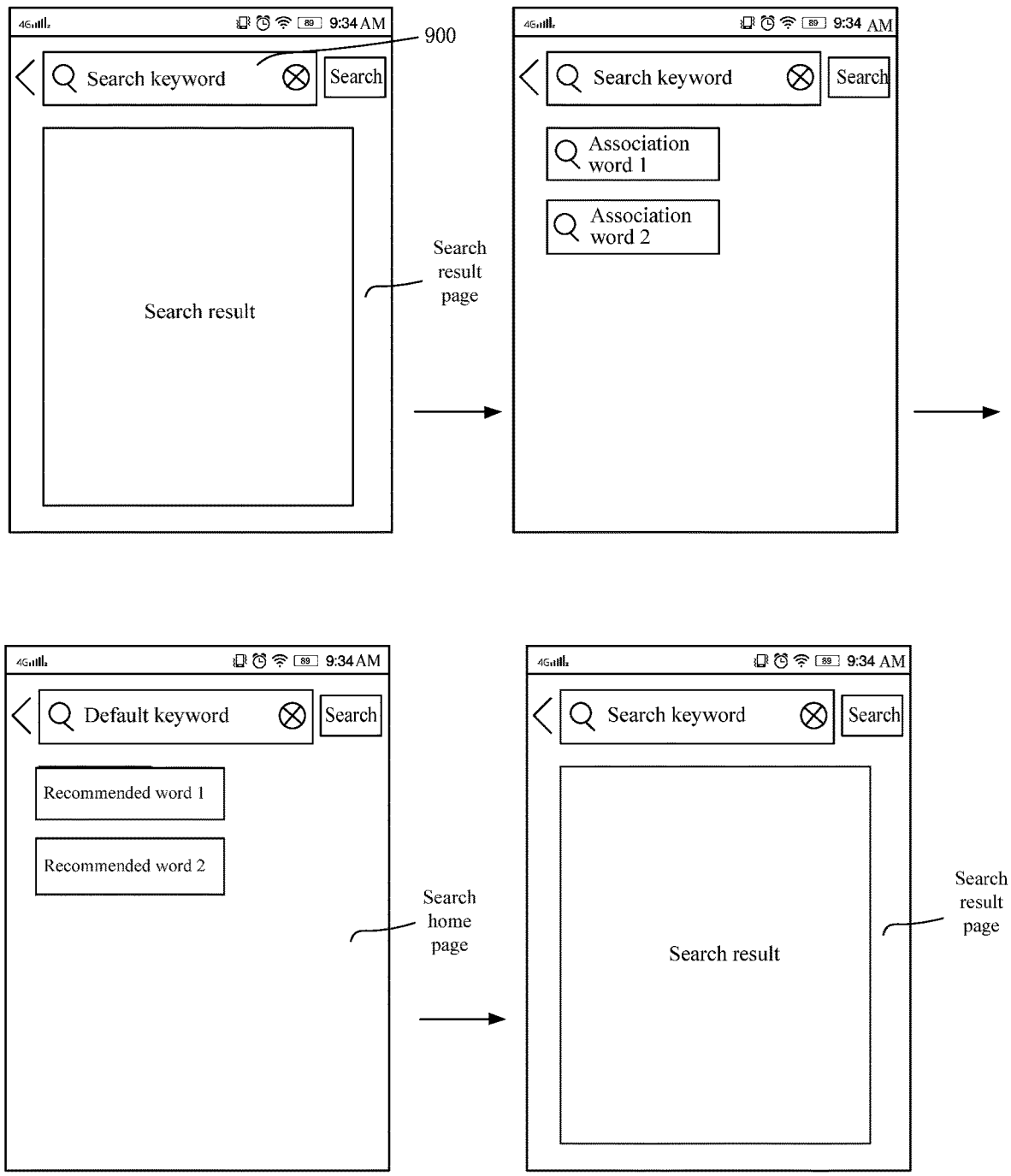
FIG. 9 illustrates a schematic diagram of a page change in a search scenario according to an example of the present disclosure.

8) As shown in FIG. 9, an association word associated with the search keyword is triggered by clicking on a search box 900 in the search result page. The search association page is entered. The existing search keyword in the search box is cleared and the search home page is returned; and the return operation is performed to return to the search result page.

In an embodiment, if the search operation is triggered by a default keyword displayed on the search home page or a search keyword inputted by a user, or triggered by any association word displayed on the search association page, a reception of the page return operation on the corresponding search result page indicates that the user may have browsed the search result corresponding to the default keyword, the inputted search keyword or the association word, or that the user does not interest in the search result corresponding to the default keyword, the inputted search keyword or the association word. In this case, a virtual keyboard for the user to input a search keyword may be displayed on the return page, such that the search keyword which the user is interested may be directly input, without clicking to trigger the virtual keyboard by the user.

In an embodiment, if the search operation is triggered based on the recommended word displayed on the search home page, the user may also be interested in other recommended words in the search home page. Therefore, before the trigger operation on the search box in the return page is received, no virtual keyboard for the user to input a search keyword is displayed on the return page, such that the user may continue to browse other recommended words.

Figure 10:
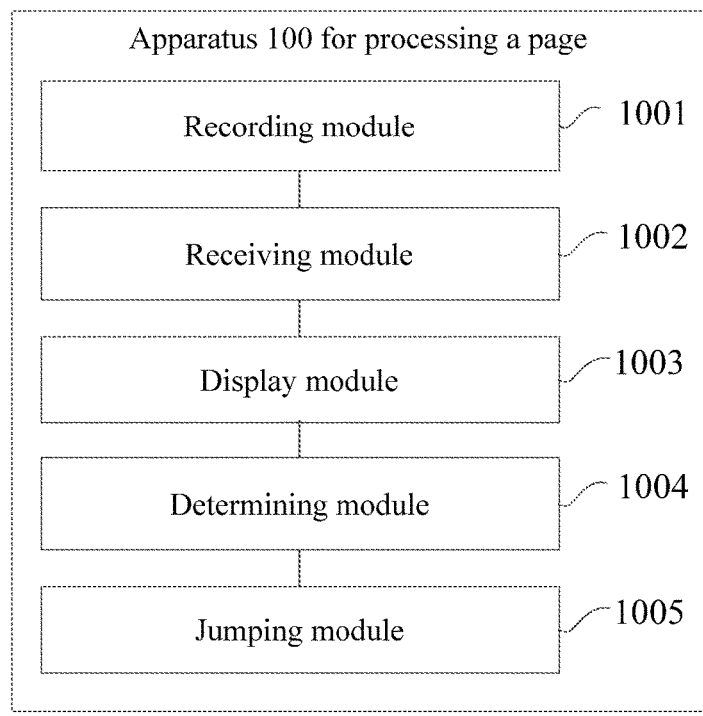
FIG. 10 illustrates a schematic structural diagram of an apparatus for processing a page according to an embodiment of the present disclosure.

An apparatus for processing a page 100 is provided according to an embodiment of the present disclosure. As shown in FIG. 10, the apparatus 100 for processing a page may include: a recording module 1001, a receiving module 1002, a display module 1003, a determining module 1004 and a jumping module 1005.

The recording module 1001 is configured to send a search request carrying a search keyword to a server in response to a search operation, and record a page for triggering the search operation.

The receiving module 1002 is configured to receive a search result, where the search result is returned by the server in response to the search request.

The display module 1003 is configured to display the search result on a search result page.

The determining module 1004 is configured to determine a return page based on the recorded page for triggering the search operation, in response to a page return operation on the search result page.

The jumping module 1005 is configured to jump to the return page.

In a possible implementation according to an embodiment of the present disclosure, when the return page is determined based on the recorded page for triggering the search operation, the determining module 1004 is further configured to:

determine the page for triggering the search operation as the return page, in the case that the page for triggering the search operation is a search home page or a search association page, where an association word associated with a search keyword inputted by a user is displayed on the search association page.

In a possible implementation according to an embodiment of the present disclosure, the search operation includes any one of:

a search operation triggered by a default keyword displayed in the search home page or a search keyword inputted by a user;

a search operation triggered by a recommended word displayed in the search home page; and a search operation triggered by an association word displayed in the search association page.

In a possible implementation according to an embodiment of the present disclosure, in the case that the search operation is a search operation triggered by a default keyword displayed in the search home page or a search keyword inputted by a user, or a search operation triggered by an association word displayed in the search association page, the apparatus 100 for processing the page further includes:

a first keyboard display module configured to display, on the return page, a virtual keyboard for a user to input a search keyword.

In a possible implementation according to an embodiment of the present disclosure, in the case that the search operation is a search operation triggered by a recommended word displayed in the search home page, the apparatus 100 for processing the page further includes:

a second keyboard display module configured to display, on the return page, no virtual keyboard for a user to input a search keyword, before a trigger operation on a search box in the return page is received.

In a possible implementation according to an embodiment of the present disclosure, in the case that the page for triggering the search operation is a search result page on which a previous search result is displayed, the apparatus 100 for processing a page further includes:

a delete module configured to delete a record of the search result page on which the previous search result is displayed, and record a search home page as the page for triggering the search operation.

In a possible implementation according to an embodiment of the present disclosure, when the return page is determined based on the recorded page for triggering the search operation, the determining module 1004 is further configured to:

determine the recorded page for triggering the search operation as the return page.

In an embodiment, if the search operation is a search operation triggered by a default keyword displayed on the search home page or a search keyword inputted by a user, or a search operation triggered by the association word displayed on the search association page, a reception of the page return operation on the corresponding search result page indicates that the user may have browsed the search result corresponding to the default keyword, the inputted search keyword or the association word, or that the user does not interest in the search result corresponding to the default keyword, the inputted search keyword or the association word. In this case, a virtual keyboard for the user to input a search keyword may be displayed on the return page, such that the search keyword which the user is interested may be directly input, without clicking to trigger the virtual keyboard by the user.

In an embodiment, if the search operation is a search operation triggered by the recommended word displayed on the search home page, the user may also be interested in other recommended words in the search home page. Therefore, before the trigger operation on the search box in the return page is received, the virtual keyboard for the user to input a search keyword is not displayed on the return page, such that the user may continue to browse other recommended words.

The apparatus for processing the page according to an embodiment of the present disclosure may execute the method for processing the page provided by the embodiment of the present disclosure, and the implementation principles of the apparatus for processing a page and the method for processing a page are similar. The actions performed by each of modules in the apparatus for processing a page according to the embodiments of the present disclosure are corresponding to the steps in the method for processing a page according to the embodiments of the present disclosure. The detailed functional description of each of the modules in the apparatus for processing a page may refer to the description of the corresponding method for processing a page shown above, which will not be repeated herein.

Figure 11:
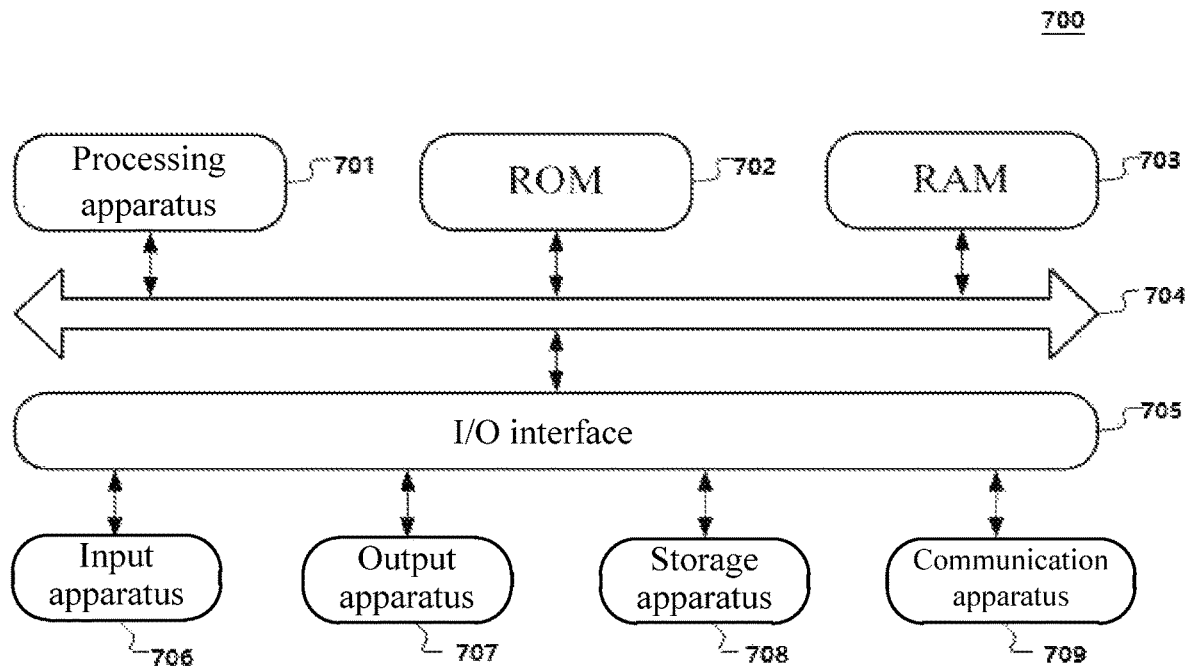
FIG. 11 illustrates a schematic structural diagram of an electronic device for processing a page according to an embodiment of the present disclosure.

Referring to FIG. 11 below, FIG. 11 shows a schematic diagram of a structure of an electronic device 700 suitable for implementing the embodiment of the present disclosure. The electronic devices according to the embodiment of the present disclosure may include, but are not limited to, a mobile terminal such as a mobile phone, a laptop, a digital broadcast receiver, a PDA (Personal Digital Assistant), a PAD (Tablet), a PMP (Portable Multimedia Player), an in-vehicle terminal (such as an in-vehicle navigation terminal) and a fixed terminal such as a digital TV, a desktop computer and so on. The electronic device shown in FIG. 11 is only exemplary, and should not indicate any limitation to the function and scope according to the embodiment of the present disclosure.

The electronic device includes: a memory, a processor, and one or more application programs, where the processor herein may be referred to as a processing apparatus 701 hereinafter, and the memory may include at least one of a read-only memory (ROM) 702, a random access memory (RAM) 703 and a storage apparatus 708. The details are as follows.

As shown in FIG. 11, the electronic device 700 may include a processing apparatus 701, such as a central processing unit (CPU) or a graphics processor, which may execute various operations and processing based on a program stored in a read only memory (ROM) 702 or a program loaded from a storage apparatus 708 into a random access memory (RAM) 703. The RAM 703 further stores various programs and data required for the electronic device 700 to perform an operation. The processing apparatus 701, the ROM 702 and the RAM 703 are connected to each other via a bus 704. An Input/output (I/O) interface 705 is also connected to the bus 704.

Generally, the I/O interface 705 may be connected to: an input apparatus 706, such as a touch screen, a touch panel, a keyboard, a mouse, a camera, a microphone, an accelerometer, and a gyroscope; an output apparatus 707, such as a liquid crystal display (LCD), a speaker, and a vibrator; a storage apparatus 708 such as a magnetic tape and a hard disk; and a communication apparatus 709. The communication apparatus 709 enables wireless or wired communication between the electronic device 700 and other devices for data exchanging. Although FIG. 11 shows an electronic device 700 having various apparatuses, it should be understood that the illustrated apparatuses are not necessarily required to all be implemented or embodied. Alternatively, more or fewer apparatuses may be implemented or included.

According to an embodiment of the present disclosure, the process described above in conjunction with flowcharts may be implemented as a computer software program. For example, a computer program product is included according to an embodiment in the present disclosure, including a computer program carried on a non-transitory computer readable storage medium. The computer program includes program code for performing the method shown in the flowchart. In the embodiment, the computer program may be downloaded and installed from the network via the communication apparatus 709, or installed from the storage apparatus 708, or installed from the ROM 702. When the computer program is executed by the processing apparatus 701, the functions defined in the method according to the embodiment of the present disclosure are performed.

It is to be noted that, the computer readable storage medium mentioned herein may be a computer readable signal medium or a computer readable storage medium or any combination thereof. The computer readable storage medium may for example be, but is not limited to, a system, an apparatus, or a device in an electronic, magnetic, optical, electromagnetic, infrared, or semi-conductive form, or any combination thereof. The specific example of the computer readable storage medium may include, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device or any combination thereof. In the present disclosure, the computer readable storage medium may be any tangible medium containing or storing a program, and the program may be used by or in combination with an instruction execution system, apparatus, or device. In the present disclosure, the computer readable signal medium may include a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable storage medium other than the computer readable storage medium, and can send, propagate or transmit programs to be used by or in combination with an instruction execution system, apparatus or device. The program codes stored in the computer readable storage medium may be transmitted via any proper medium including but not limited to: a wire, an optical cable, radio frequency and so on, or any proper combination thereof.

In some embodiments, a client and a server may use any currently known or future developed network protocol such as HTTP (HyperText Transfer Protocol) to communicate, and may interconnect with digital data communication in any form or medium (for example, a communication network). Examples of communication network include a local area network ("LAN"), a wide area network ("WAN"), an internet work (for example, an Internet), and a peer-to-peer network (for example, an ad hoc peer-to-peer network), as well as any currently known or future developed network.

The computer readable storage medium may be incorporated in the electronic device, or may exist alone without being assembled into the electronic device.

The computer readable storage medium carries one or more programs. The one or more programs, when executed by the electronic device, cause the electronic device to:

send a search request carrying a search keyword to a server in response to a search operation, and record a page for triggering the search operation;

receive a search result, where the search result is returned by the server in response to the search request;

display the search result on a search result page;

determine a return page based on the recorded page for triggering the search operation, in response to a page return operation on the search result page; and jump to the return page.

The computer program code for performing the operations disclosed in the present disclosure may be written in one or more programming languages or combinations thereof. The programming languages include but not limited to an object-oriented programming language, such as Java, Smalltalk, and C++, and a conventional procedural programming language, such as C language or a similar programming language. The program code may be executed entirely on a user computer, partially on the user computer, as a standalone software package, partially on the user computer and partially on a remote computer, or entirely on the remote computer or a server. In a case involving a remote computer, the remote computer may be connected to a user computer through any kind of network including a local area network (LAN) or a wide area network (WAN), or may be connected to an external computer (for example, be connected through Internet connection by an Internet service provider).

Flowcharts and block diagrams in the drawings illustrate the architecture, functions and operations that can be implemented by the system, method and computer program product according to the embodiments of the present disclosure. Each block in a flowchart or a block diagram may represent a module, a program segment, or a part of code, and part of the module, the program segment, or the code contains one or more executable instructions for implementing the specified logical function. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It is also noted that, each block in a block diagram and/or a flowchart and a combination of blocks in the block diagram and/or the flowchart may be implemented by using a dedicated hardware-based system configured to perform a specified function or operation, or may be implemented by using a combination of dedicated hardware and a computer instruction.

The modules and units mentioned in the description of the embodiments of the present disclosure may be implemented by means of software, or otherwise by means of hardware. The name of the module or unit does not constitute a limitation on the unit itself under certain circumstances, for example, the recording module may also be described as "a module configured to record a page for triggering the search operation".

The functions described herein may be performed, at least in part, by one or more hardware logic components. For example, without limitation, exemplary types of hardware logic components that may be used include: a Field Programmable Gate Array (FPGA), an Application Specific Integrated Circuit (ASIC), an Application Specific Standard Product (ASSP), a System on Chip (SOC), a Complex Programmable Logical Device (CPLD) and so on.

In the context of the present disclosure, a machine readable medium may be tangible medium containing or storing a program which be used by or in combination with an instruction execution system, apparatus, or device. The machine readable medium may be a machine readable signal medium or a machine readable storage medium. The machine readable medium may include but not limited to, a system, an apparatus, or a device in an electronic, magnetic, optical, electromagnetic, infrared, or semi-conductive form, or any combination thereof. The specific example of the machine readable storage medium may include an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device or any combination thereof.

According to one or more embodiments of the present disclosure, a method for processing a page is provided. The method includes:

sending a search request carrying a search keyword to a server in response to a search operation, and recording a page for triggering the search operation;

receiving a search result, where the search result is returned by the server in response to the search request;

displaying the search result on a search result page;

determining a return page based on the recorded page for triggering the search operation, in response to a page return operation on the search result page; and jumping to the return page.

According to one or more embodiments of the present disclosure, the determining a return page based on the recorded page for triggering the search operation includes:

determining the page for triggering the search operation as the return page, in the case that the page for triggering the search operation is a search home page or a search association page, where an association word associated with a search keyword inputted by a user is displayed on the search association page.

According to one or more embodiments of the present disclosure, the search operation includes any one of:

a search operation triggered by a default keyword displayed in the search home page or a search keyword inputted by a user;

a search operation triggered by a recommended word displayed in the search home page; and a search operation triggered by the association word displayed in the search association page.

According to one or more embodiments of the present disclosure, in the case that the search operation is the search operation triggered by the default keyword displayed in the search home page or the search keyword inputted by the user, or the search operation triggered by the association word displayed in the search association page, the method for processing the page further includes:

displaying, on the return page, a virtual keyboard for the user to input the search keyword.

According to one or more embodiments of the present disclosure, in the case that the search operation is the search operation triggered by the recommended word displayed in the search home page, the method for processing the page further includes:

displaying, on the return page, no virtual keyboard for the user to input the search keyword, before a trigger operation on a search box in the return page is received.

According to one or more embodiments of the present disclosure, in the case that the page for triggering the search operation is a search result page on which a previous search result is displayed, after displaying the search result on the search result page, the method further includes:

deleting a record of the search result page on which the previous search result is displayed, and recording a search home page as the page for triggering the search operation.

According to one or more embodiments of the present disclosure, the determining a return page based on the recorded page for triggering the search operation includes:

determining the recorded page for triggering the search operation as the return page.

The above descriptions are only preferred embodiments of the present disclosure and explanations of the technical principles used in the present disclosure. Those skilled in the art should understand that the scope of the present disclosure is not limited to the technical solution formed by combination of the technical features described above, but also covers other technical solutions formed by any combination of the above technical features or the equivalent features of the technical features without departing from the concept of the present disclosure. For example, a technical solution formed by interchanging the above features and technical features having similar functions as disclosed, (but not limited to), in the present disclosure.

In addition, although the above operations are described in a specific order, it should not be understood that these operations are required to be performed in the specific order or performed in a sequential order. In some conditions, multitasking and parallel processing may be advantageous. Although multiple implementation details are included in the above descriptions, the details should not be interpreted as limitations to the scope of the present disclosure. Some features described in a context of an embodiment may be implemented in combination in an embodiment. In addition, the features described in an embodiment may be implemented individually or in any suitable sub-combination form in multiple embodiments.

Although the subject of the present disclosure has been described according to the structural features and/or logical actions of the method, it should be understood that the subject defined in the claims is not necessarily limited to the features or actions described above. The specific features and actions described above are only examples of the implementation of the claims.

The invention claimed is:

1. A method for processing a page, comprising:

sending a search request carrying a search keyword to a server in response to a search operation, and recording a page for triggering the search operation;

receiving a search result, wherein the search result is returned by the server in response to the search request;

displaying the search result on a search result page;

determining a return page based on the recorded page for triggering the search operation, in response to a page return operation on the search result page; and jumping to the return page, wherein in a case that the page for triggering the search operation is a search result page on which a previous search result is displayed, after displaying the search result on the search result page, the method further comprises:
  deleting a record of the search result page on which the previous search result is displayed, and recording a search home page as the page for triggering the search operation.

2. The method for processing the page according to claim 1, wherein the determining a return page based on the recorded page for triggering the search operation comprises:
  determining the page for triggering the search operation as the return page, in a case that the page for triggering the search operation is a search home page or a search association page, wherein an association word associated with a search keyword inputted by a user is displayed on the search association page.

3. The method for processing the page according to claim 2, wherein the search operation comprises any one of:
  a search operation triggered by a default keyword displayed in the search home page or the search keyword inputted by the user;
  a search operation triggered by a recommended word displayed in the search home page; and
  a search operation triggered by the association word displayed in the search association page.

4. The method for processing the page according to claim 3, wherein in a case that the search operation is the search operation triggered by the default keyword displayed in the search home page or the search keyword inputted by the user, or the search operation triggered by the association word displayed in the search association page, the method for processing the page further comprises:
  displaying, on the return page, a virtual keyboard for the user to input the search keyword.

5. The method for processing the page according to claim 3, wherein in a case that the search operation is the search operation triggered by the recommended word displayed in the search home page, the method for processing the page further comprises:
  displaying, on the return page, no virtual keyboard for the user to input the search keyword, before a trigger operation on a search box in the return page is received.

6. The method for processing the page according to claim 1, wherein the determining a return page based on the recorded page for triggering the search operation comprises:
  determining the recorded page for triggering the search operation as the return page.

7. An apparatus for processing a page comprising:
  one or more processors;
  a memory; and
  one or more application programs stored in the memory, wherein the one or more application programs, when executed by the one or more processors, cause the one or more processors to:
    send a search request carrying a search keyword to a server in response to a search operation, and record a page for triggering the search operation;
    receive a search result, wherein the search result is returned by the server in response to the search request;
    display the search result on a search result page;
    determine a return page based on the recorded page for triggering the search operation, in response to a page return operation on the search result page; and
    jump to the return page,
    wherein in a case that the page for triggering the search operation is a search result page on which a previous search result is displayed, after displaying the search result on the search result page, the one or more application programs, when executed by the one or more processors, cause the one or more processors to:
      delete a record of the search result page on which the previous search result is displayed, and record a search home page as the page for triggering the search operation.

8. The apparatus for processing the page according to claim 7, wherein the one or more application programs, when executed by the one or more processors, cause the one or more processors to:
  determine the page for triggering the search operation as the return page, in a case that the page for triggering the search operation is a search home page or a search association page, wherein an association word associated with a search keyword inputted by a user is displayed on the search association page.

9. The apparatus for processing the page according to claim 7, wherein the search operation comprises any one of:
  a search operation triggered by a default keyword displayed in the search home page or the search keyword inputted by a user;
  a search operation triggered by a recommended word displayed in the search home page; and
  a search operation triggered by an association word displayed in the search association page.

10. The apparatus for processing the page according to claim 9, wherein in a case that the search operation is the search operation triggered by the default keyword displayed in the search home page or the search keyword inputted by the user, or the search operation triggered by the association word displayed in the search association page,
  the one or more application programs, when executed by the one or more processors, cause the one or more processors to:
  display, on the return page, a virtual keyboard for the user to input the search keyword.

11. The apparatus for processing the page according to claim 9, wherein in a case that the search operation is the search operation triggered by the recommended word displayed in the search home page,
  the one or more application programs, when executed by the one or more processors, cause the one or more processors to:
  display, on the return page, no virtual keyboard for the user to input the search keyword, before a trigger operation on a search box in the return page is received.

12. The apparatus for processing the page according to claim 7, wherein the one or more application programs, when executed by the one or more processors, cause the one or more processors to:
  determine the recorded page for triggering the search operation as the return page.

13. A non-transitory computer readable storage medium having a computer program stored thereon, which the computer program, when executed by a processor, causes the processor to:
  send a search request carrying a search keyword to a server in response to a search operation, and record a page for triggering the search operation;
  receive a search result, wherein the search result is returned by the server in response to the search request;
  display the search result on a search result page;

determine a return page based on the recorded page for triggering the search operation, in response to a page return operation on the search result page; and jump to the return page, wherein in a case that the page for triggering the search operation is a search result page on which a previous search result is displayed, after displaying the search result on the search result page, the computer program, when executed by a processor, causes the processor to:

delete a record of the search result page on which the previous search result is displayed, and record a search home page as the page for triggering the search operation.

14. The non-transitory computer readable storage medium according to claim 13, wherein the computer program, when executed by a processor, causes the processor to:

determine the page for triggering the search operation as the return page, in a case that the page for triggering the search operation is a search home page or a search association page, wherein an association word associated with a search keyword inputted by a user is displayed on the search association page.

15. The non-transitory computer readable storage medium according to claim 14, wherein the search operation comprises any one of:

a search operation triggered by a default keyword displayed in the search home page or the search keyword inputted by the user;

a search operation triggered by a recommended word displayed in the search home page; and a search operation triggered by the association word displayed in the search association page.

16. The non-transitory computer readable storage medium according to claim 15, wherein in a case that the search operation is the search operation triggered by the default keyword displayed in the search home page or the search keyword inputted by the user, or the search operation triggered by the association word displayed in the search association page, the computer program, when executed by a processor, causes the processor to:

display, on the return page, a virtual keyboard for the user to input the search keyword.

17. The non-transitory computer readable storage medium according to claim 15, wherein in a case that the search operation is the search operation triggered by the recommended word displayed in the search home page, the computer program, when executed by a processor, causes the processor to:

display, on the return page, no virtual keyboard for the user to input the search keyword, before a trigger operation on a search box in the return page is received.

* * * * *